United States Patent
Iyer et al.

(10) Patent No.: US 8,239,308 B2
(45) Date of Patent: Aug. 7, 2012

(54) CLEARING SYSTEM THAT DETERMINES MARGIN REQUIREMENTS FOR FINANCIAL PORTFOLIOS

(75) Inventors: Suneel Iyer, Naperville, IL (US); Moody Hadi, Chicago, IL (US); Amy McCormick, Chicago, IL (US); Ketan Patel, Hanover Park, IL (US); Ankeet Dedhia, Chicago, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 330 days.

(21) Appl. No.: 12/649,267

(22) Filed: Dec. 29, 2009

(65) Prior Publication Data
US 2011/0161244 A1 Jun. 30, 2011

(51) Int. Cl.
*G06Q 40/00* (2012.01)
(52) U.S. Cl. .................................................. 705/36 R
(58) Field of Classification Search .................. 705/35, 705/36 R, 37
See application file for complete search history.

(56) References Cited

U.S. PATENT DOCUMENTS
7,499,881 B2 * 3/2009 Henninger et al. ......... 705/36 R
8,024,255 B2 * 9/2011 Anguish et al. ................ 705/37

OTHER PUBLICATIONS

BM&F, Swap Margin Calculation Criteria, downloaded Oct. 30, 2009, 12 pages.
Derivative Instruments, Copyright 1997-2003 by Montego Data Limited, downloaded Nov. 5, 2007, 8 pages.
Interest rate swap, http://en.wikipedia.org/wiki/Interest_rate_swap; downloaded Oct. 30, 2009, 7 pages.
Yield Curve, http://en.wikipedia.org/wiki/Yield_curve; downloaded Oct. 30, 2009, 8 pages.

* cited by examiner

*Primary Examiner* — Olabode Akintola
(74) *Attorney, Agent, or Firm* — Banner & Witcoff, Ltd.

(57) ABSTRACT

Methods, systems and apparatuses are described for calculating a performance bond amount for a portfolio including interest rate swaps. A risk calculation module (or risk processor) may assist in the calculation. In some examples, values, such as swap (DV01) dollar values and volatility values, and adjustments/factors, such as calendar charge adjustments and liquidity charge minimums, may be used to enhance the margin calculation. These values may be maintained and updated in various ways, including but not limited to, lookup tables, matrices, and other structures. The margin calculations may be used by an exchange or clearinghouse to request a portfolio holder to deposit additional funds towards a performance bond associated with the portfolio.

31 Claims, 7 Drawing Sheets

| Tenor | 99th percentile vol in bps |
|---|---|
| 1 month | 90 |
| 2 month | 75 |
| 3 month | 95 |
| 4 month | 85 |
| 5 month | 80 |
| 6 month | 40 |
| 7 month | 70 |
| 8 month | 55 |
| 9 month | 35 |
| 10 month | 55 |
| 11 month | 60 |
| 1 year | 35 |
| 2 year | 45 |
| 3 year | 40 |
| 4 year | 40 |
| 5 year | 40 |
| 6 year | 45 |
| 7 year | 45 |
| 8 year | 40 |
| 9 year | 40 |
| 10 year | 40 |
| 12 year | 40 |
| 15 year | 45 |
| 20 year | 45 |
| 25 year | 50 |
| 30 year | 55 |

Figure 5

CLEARING SYSTEM THAT DETERMINES MARGIN REQUIREMENTS FOR FINANCIAL PORTFOLIOS

TECHNICAL FIELD

The present invention relates to a portfolio of financial instruments. In particular, aspects of the invention relate to calculating a performance bond amount for a portfolio of financial instruments.

BACKGROUND

According to Wikipedia, an interest rate swap (IRS) is a derivative in which one party exchanges a stream of interest payments for another party's stream of cash flows. IRSs can be used by hedgers to manage their fixed or floating assets and liabilities. They can also be used by speculators to replicate unfunded bond exposures to profit from changes in interest rates. IRS may come in many different types, including fixed-for-floating rate swaps, floating-for-floating rate swaps, and fixed-for-fixed rate swaps. The present value of a plain vanilla swap can be computed using well-known formulas: the value of the fixed leg is given by the present value of the fixed coupon payments known at the start of the swap, and the value of the floating leg is given by the present value of the floating coupon payment determined at the agreed dates of each payment. Therefore, at the time the IRS is entered into, there is no advantage to either counterparty.

IRSs, however, expose their holders to interest rate risk and credit risk, Wikipedia explains. In a plain vanilla fixed-for-floating swap, the party who pays the floating rate benefits when rates fall. Meanwhile, credit risk on the IRS comes into play if the swap is in the money or not. If one of the parties is in the money, then that party faces credit risk of possible default by another party.

Techniques for measuring risk of a swap are well known in the industry. The DV01 approach uses the dollar value of a one basis point (bps) change in a swap's fixed interest rate to measure risk. DV01 is measured in units of USD per bps. Nevertheless, enhanced techniques and devices to better calculate margin risk associated with a portfolio comprising IRSs is desired.

BRIEF SUMMARY

A method is disclosed for calculating a performance bond amount for a plurality of interest rate swaps in a portfolio of financial assets using a risk calculation module. The margin calculations may use a swap (DV01) dollar value and a volatility value to determine the amount of a performance bond required of a holder of the portfolio. If the margin calculation results in a calculated performance bond amount that is greater than the current amount of the holder's margin account balance, a request may be sent to increase the margin account balance.

In another embodiment in accordance with aspects of the invention, the performance bond amount calculated by the risk calculation module may be enhanced by considering a calendar charge adjustment to account for non-parallel shifts in a swap curve. In yet another embodiment, the performance bond amount calculated by the risk calculation module may be enhanced by considering a liquidity charge minimum.

Moreover, various aspects of the aforementioned methodology may be implemented in an apparatus comprising a risk calculation module, one or more processors (e.g., risk processor), one or more memories, and other modules. Information may be stored in the memories to assist the risk calculation module (or risk processor) in calculating a performance bond amount. Information corresponding to a calendar charge lookup table, liquidity charge minimum lookup table, volatility lookup table, and/or swap DV01 matrix may be stored in the one or more memories.

Of course, the methods and systems of the above-referenced embodiments may also include other additional elements, steps, computer-executable instructions, or computer-readable data structures. In this regard, other embodiments are disclosed and claimed herein as well. In other embodiments, the present invention can be partially or wholly implemented on a computer-readable medium, for example, by storing computer-executable instructions or modules, or by utilizing computer-readable data structures.

The details of these and other embodiments of the present invention are set forth in the accompanying drawings and the description below. Other features and advantages of the invention will be apparent from the description and drawings, and from the claims.

BRIEF DESCRIPTION OF DRAWINGS

The present invention may take physical form in certain parts and steps, embodiments of which will be described in detail in the following description and illustrated in the accompanying drawings that form a part hereof, wherein:

FIG. 5 shows a high-level illustration of an exemplary volatility lookup table in accordance with various aspects of the invention;

DETAILED DESCRIPTION

Methods, systems and apparatuses are described for calculating a performance bond amount for a portfolio of financial assets, including interest rate swaps. A risk calculation module (or risk processor) may assist in the calculation. In some examples, values (e.g., swap DV01s, volatility values, etc.) and adjustments/factors (e.g., calendar charge adjustments, liquidity charge minimums, etc.) may be used to enhance the margin calculation. These values may be maintained and updated in various ways, including but not limited to, lookup tables, matrices, and other structures. The margin calculations may be used by an exchange or clearinghouse, for example, to request a portfolio holder to deposit additional funds into a margin account towards a performance bond. The clearinghouse (e.g., central counterparty to financial products) may use the performance bond to counter margin risk associated with the portfolio.

Figure 1:
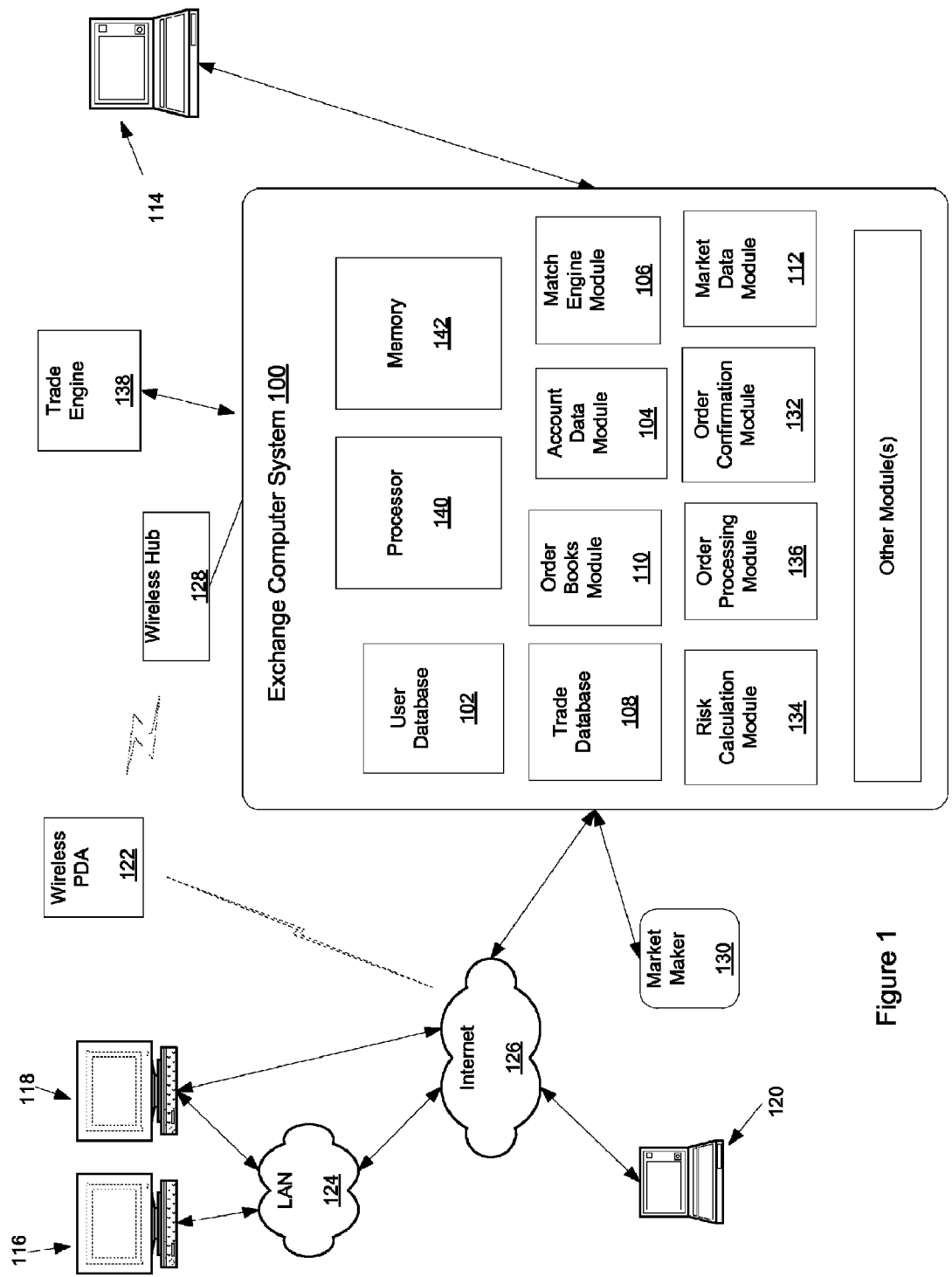
FIG. 1 depicts an illustrative computer network system that may be used to implement various aspects of the invention.

FIG. 1 depicts an illustrative operating environment that may be used to implement various aspects of the invention.

The operating environment is only one example of a suitable operating environment and is not intended to suggest any limitation as to the scope of use or functionality of the invention. Aspects of the invention are preferably implemented with computer devices and computer networks that allow the exchange/transmission/reception of information including, but not limited to performance bond amount requirements and trading information. An exchange computer system 100 receives market data, analyzes historical data, and calculates various values, e.g., performance bond amounts, in accordance with aspects of the invention.

Exchange computer system 100 may be implemented with one or more mainframes, servers, gateways, controllers, desktops or other computers. The exchange computer system 100 may include one or more modules, processors, databases, and other components, such as those illustrated in FIG. 1. Moreover, computer system 100 may include one or more processors 140 (e.g., Intel® microprocessor, AMD® microprocessor, risk processor, etc.) and one or more memories 142 (e.g., solid state, DRAM, SRAM, ROM, Flash, non-volatile memory, hard drive, registers, buffers, etc.) In addition, an electronic trading system 138, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device.

A match engine module 106 may match bid and offer prices for orders configured in accordance with aspects of the invention. Match engine module 106 may be implemented with software that executes one or more algorithms for matching bids and offers for bundled financial instruments in accordance with aspects of the invention. The match engine module and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed.

Furthermore, an order book module 110 may be included to compute or otherwise determine current bid and offer prices. The order book module 110 may be configured to calculate the price of a financial instrument. Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). In addition, an order confirmation module 132 may be configured to provide a confirmation message when the match engine module 106 finds a match for an order and the order is subsequently executed. The confirmation message may, in some embodiments, be an e-mail message to a trader, an electronic notification in one of various formats, or any other form of generating a notification of an order execution.

A market data module 112 may be included to collect market data and prepare the data for transmission to users. In addition, a risk calculation module 134 may be included in computer system 100 to compute and determine the amount of risk associated with a financial product or portfolio of financial products. An order processing module 136 may be included to receive data associated with an order for a financial instrument. The module 136 may decompose delta based and bulk order types for processing by order book module 110 and match engine module 106. The order processing module 136 may be configured to process the data associated with the orders for financial instruments.

A user database 102 may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown communicatively connected to exchange computer system 100. Exchange computer system 100 and computer device 114 may be connected via a T1 line, a common local area network (LAN) a wireless communication device or any other mechanism for communicatively connecting computer devices. Computer (i.e., electronic) devices 116 and 118 are coupled to a local area network ("LAN") 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a wireless PDA 122 includes mobile telephones and other devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126, however, the connection may be via a modem, DSL line, satellite dish or any other device for communicatively connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 114 may include computer-executable instructions for receiving interest rate and other information from computer system 100 and displaying to a user. In another example, computer device 118 may include computer-executable instructions for receiving market data from computer system 100 and displaying that information to a user. In yet another example, a processor 140 of computer system 100 may be configured to execute computer-executable instructions that cause the system 100 to calculate a performance bond amount required to balance risk associated with a portfolio.

Of course, numerous additional servers, computers, handheld devices, personal digital assistants, telephones and other devices may also be connected to computer system 100. Moreover, one skilled in the art will appreciate that the topology shown in FIG. 1 is merely an example and that the components shown in FIG. 1 may be connected by numerous alternative topologies.

Figure 2:
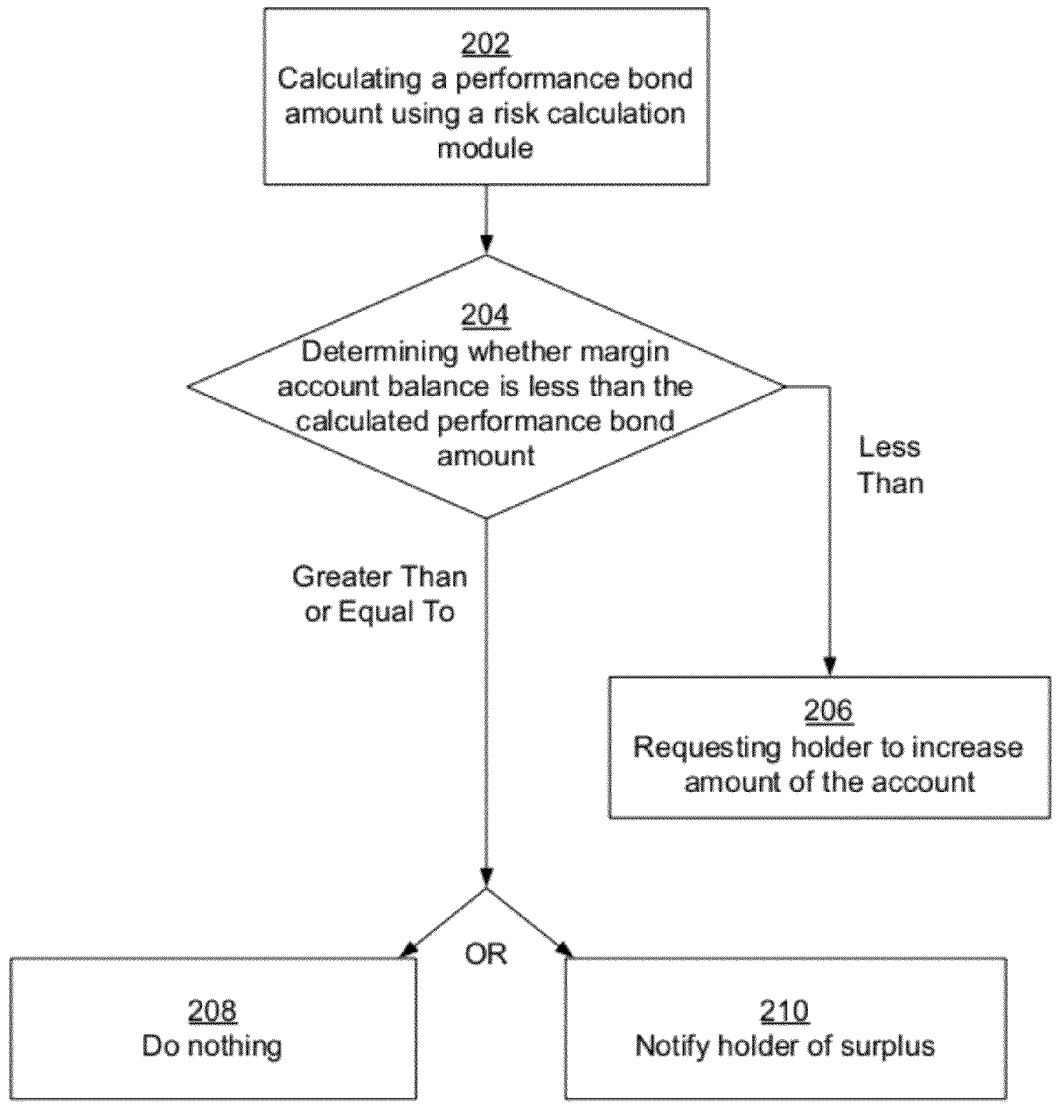
FIG. 2 illustrates an exemplary margining methodology in accordance with aspects of the invention.

FIG. 2 illustrates an exemplary margining methodology to calculate performance bond amounts for interest rate swaps. In step 202, a risk calculation module (or risk processor) may be used to calculate a performance bond amount for a plurality of interest rate swaps in a portfolio. The portfolio may include financial instruments other than just spot vanilla interest rate swaps. For example, the portfolio may be using interest rate swaps to hedge against risk associated with fixed or floating assets and liabilities in the portfolio. In addition, the financial instruments in the portfolio may be based in different currencies.

In step 204, the balance of an account (e.g., margin account) associated with the portfolio may be compared with the performance bond amount calculated in step 202. If the balance is insufficient to cover the calculated performance bond amount, then a notification may be generated that an increase in the amount of the account to at least the calculated performance bond amount is required. The holder of the portfolio may be requested (in step 206) to increase the amount of the margin account to at least the calculated performance bond amount. The holder of the portfolio may be the owner of the portfolio, a trustee appointed to act as fiduciary for managing the portfolio, or any other person or entity responsible for the portfolio. The generated notification and requesting may be performed through electronic communication (e.g., e-mail, SMS, instant message, etc.) or through manual communication (e.g., a "margin call" from a customer service representative). In an alternative embodiment, the holder may have a prior agreement with an exchange (or other entity) to automatically increase a margin account amount simply in response to receiving a request (of step 206). In such an arrangement, information about an account designated by the holder may be maintained in an account data module 104 and the account may be funded with sufficient assets (e.g., from another account, from another brokerage account, etc.) to cover such "margin calls."

Meanwhile, if the margin account balance is sufficient to cover the calculated performance bond amount, then no action may be necessary (e.g., as in step 208). Alternatively, the holder of the portfolio may be notified (in step 210) that the margin account balance is in surplus compared to the requisite performance bond amount calculated (in step 202). The notification (of step 210) may be carried out in numerous ways, including but not limited to, using electronic communication (e.g., e-mail, SMS, instant message, etc.) or manual communication (e.g., a "margin call" from a customer service representative).

Figure 3:
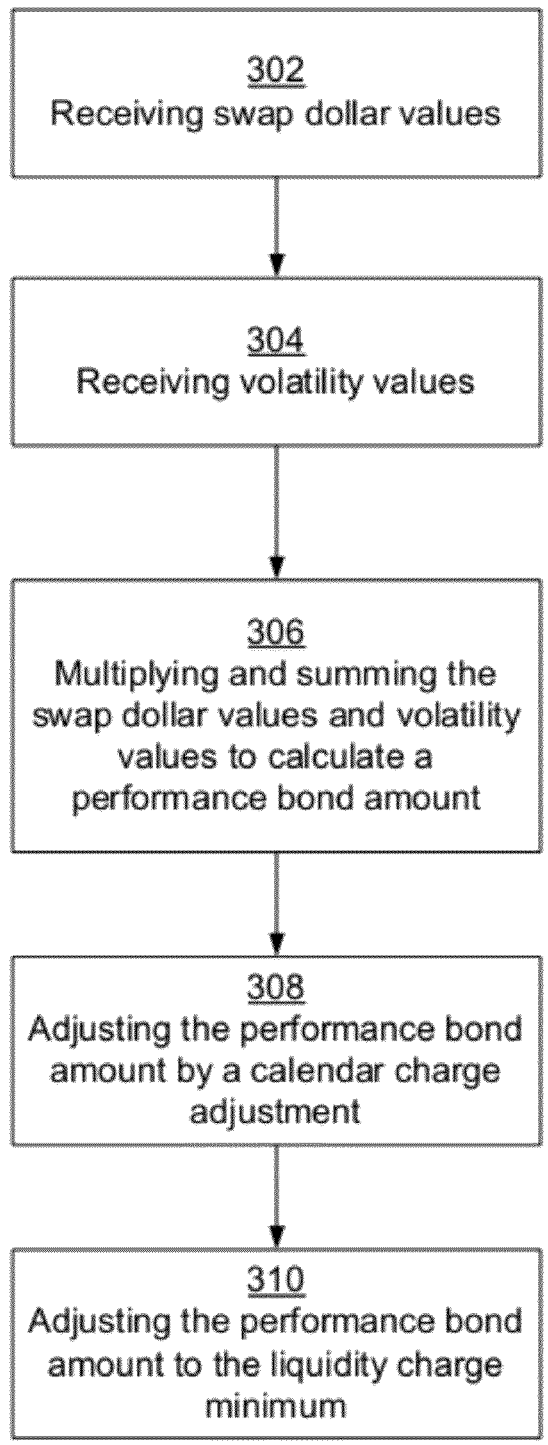
FIG. 3 shows a flowchart of an exemplary risk calculation module (or risk processor) in accordance with various aspects of the invention.

Referring to FIG. 3, a risk calculation module (or risk processor) in accordance with various aspects of the invention may calculate a performance bond amount for a plurality of interest rate swaps in a portfolio. The risk calculation module (or risk processor) may calculate the basic performance bond amount based a function (e.g., multiplication) of a swap (DV01) dollar value and a volatility value corresponding to each interest rate swap in the portfolio. For example, the risk calculation module (or risk processor) may receive (in step 302) a swap (DV01) dollar value for an interest rate swap. Swap (DV01) dollar values are measured in the same units as DV01, but are a function of a swap's remaining maturity and its fixed rate. The risk calculation module (or risk processor) may also receive (in step 304) a volatility value for an interest rate swap. The risk calculation module (or risk processor) may perform a function (e.g., multiplication) of these two values to determine the basic performance bond amount required to manage the risk associated with the interest rate swap. If the portfolio contains multiple interest rate swaps, the basic performance bond amount may be calculated in the aforementioned manner for each interest rate swap in the portfolio, and, for example, the multiplications may be summed (in step 306) to calculate a total performance bond amount required for the plurality of interest rate swaps in the portfolio.

The volatility value received at the risk calculation module (or risk processor) and used in the basic performance bond amount calculation may be determined using a volatility lookup table indexed by swap tenors at predetermined intervals. The volatility value of an interest rate swap is based on the time remaining until maturity of the interest rate swap. In other words, the swap tenor may indicate the amount of time remaining until the swap matures. The volatility value may be irrespective of the fixed rate of an interest rate swap. For example, all interest rate swaps with one year remaining until maturity may be grouped together and analyzed to determine the volatility value for the particular swap tenor (e.g., 1 year). As such, a search of the volatility lookup table by swap tenor (i.e., the amount of time remaining until maturity) returns the volatility value (in units of basis points) for the appropriate swap tenor. The volatility value may be input into the risk calculation module (or risk processor).

The volatility lookup table may be populated with values using the results of a historical analysis of spot swap fixed settlements. In one example, two years (or other duration of time) worth of historical 2-day returns (or returns of over another time period) of spot swap fixed settlements may be obtained from a data service (e.g., Bloomberg, etc.) or from the trade database 108. These two-day returns may be used to obtain 99th percentile (or other percentile) historical volatilities for historical spot swap data. For example, FIG. 5 illustrates an exemplary volatility lookup table in accordance with various aspects of the invention. For example, for an interest rate swap with five months remaining (i.e., a 5 M tenor), FIG. 5 indicates a volatility value of 80 bps (see ref. 502). Meanwhile, for interest rate swaps, irrespective of their fixed rates, with a 3 year tenor, the volatility value is 40 bps (see ref. 504). One skilled in the art will appreciate that the volatility lookup table may be implemented in various ways, including but not limited to, as a software modules (e.g., "Other Module" in FIG. 1) that receives swap tenor as an input parameter returns the corresponding volatility value. The volatility lookup table may be stored in computer memory and accessed by such a module. One skilled in the art will appreciate that the swap tenor value provided as an input parameter may be rounded as appropriate to identify a swap tenor "bucket" (i.e., substantially same time remaining until maturity) in the volatility lookup table. In an alternative embodiment, the volatility lookup table may be more or less granular with respect to swap tenor. For example, with sufficient computing power available, the swap tenor granularity may be weekly, daily, hourly, in realtime, etc., and the values in the table may be updated weekly, daily, hourly, in realtime, etc.

Furthermore, the swap (DV01) dollar value received at the risk calculation module (or risk processor) and used in the basic performance bond amount calculation may be determined using a swap DV01 matrix based on the time remaining until maturity of the interest rate swap (i.e., swap tenor) and the fixed rate of the interest rate swap. Unlike a volatility value, the swap (DV01) dollar value for an interest rate swap is dependent on the fixed rate of the swap. As such, a search of the 2-dimensional swap DV01 matrix by both swap tenor (i.e., the amount of time remaining until maturity) and the fixed rate of the swap, then returns the swap (DV01) dollar value (in units of USD per basis point) for the appropriate swap tenor and fixed rate. The swap (DV01) dollar value may be input into the risk calculation module (or risk processor).

Figure 4:
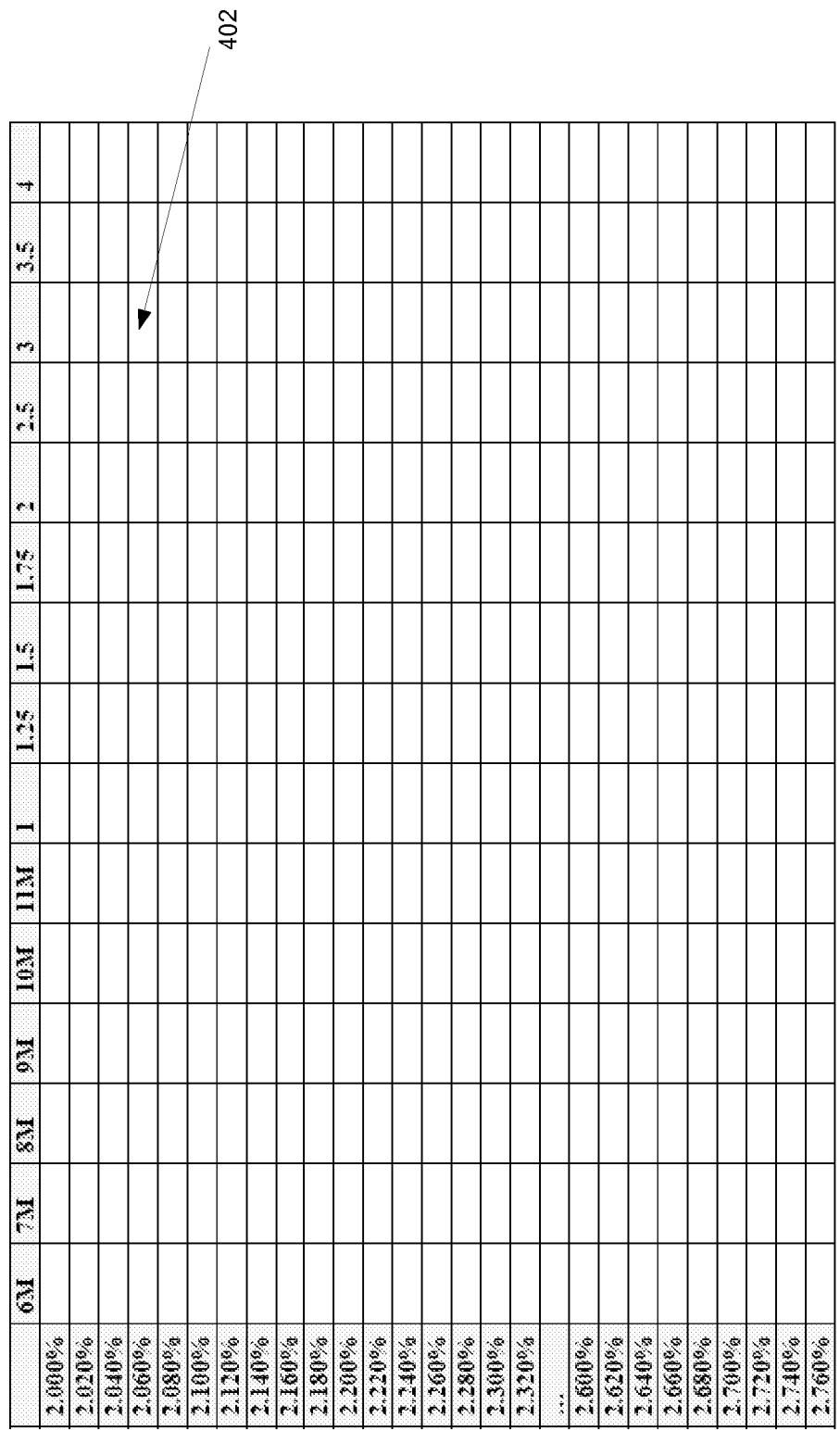
FIG. 4 shows a high-level illustration of an exemplary swap DV01 matrix in accordance with various aspects of the invention.

Referring to FIG. 4, the swap DV01 matrix may accommodate swaps of any swap tenor. In one example, the swap (DV01) dollar value of a 3 year swap tenor with a fixed rate of 2.060% may be located at ref. 402 in FIG. 4. In another example, the swap DV01 matrix may run out to 30 years, and be broken into a granularity of months. One skilled in the art will appreciate that the granularity may be increased or decreased as desired. For example, the granularity may be increased to show daily maturities. In another example, monthly increments may be shown for swap tenors up to one year, then swap tenors may be shown at quarterly increments. Likewise, the swap DV01 matrix may accommodate swaps within a range of interest rates (e.g., 0.1% to 10.0%). The granularity of the fixed swap rates may be increased or decreased as desired. For example, the fixed rates may increment in 10 bps increments. The swap DV01 matrix may be updated daily because the values in the matrix depend on swap tenor, which inherently changes with the passage of time. The swap DV01 matrix may be populated with data generated from a historical analysis.

One skilled in the art will appreciate that the swap DV01 matrix may be implemented in various ways, including but not limited to, as a software modules (e.g., "Other Module" in FIG. 1) that receives swap tenor and interest rate as input parameters and returns the corresponding swap (DV01) dollar value. The swap DV01 matrix may be stored in computer memory and accessed by such a module. One skilled in the art will appreciate that the values provided as an input parameters may be rounded as appropriate to identify a swap tenor "bucket" or interest rate "bucket" in the matrix. With sufficient computing power available, the matrix may be updated weekly, daily, hourly, in realtime, etc.

Per the aforementioned basic margin calculation methodology the calculated performance bond amount is based on swap dollar values and volatilites of each swap contract. However, such calculations may be enhanced to fully account for the totality of the risk associated with the portfolio. For example, margin risk calculated based purely on a swap dollar value basis can result in a performance bond amount that is too low to be commensurate with the true risk of a portfolio. Rather, the risk calculation may be enhanced by providing consideration to numerous factors, including, but not limited to, liquidity and other forms of risk posed by interest rate swaps.

The risk calculation module (or risk processor), in some embodiments in accordance with aspects of the invention, may adjust the calculated performance bond amount by a calendar charge adjustment to account for non-parallel shifts in the swap curve. Calendar charges are margin charges in addition to the aforementioned basic margin calculations (based on swap dollar values and volatility values). They account for the true 99% 2-day risk with a given spread. Calendar charges may be calculated using historical data (e.g., two years of historical data, with 2-days of P&L coverage, and 99% value at risk (VaR)).

Figure 6:
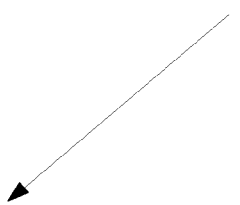
FIG. 6 shows a high-level illustration of an exemplary calendar charge lookup table in accordance with various aspects of the invention.

A calendar charge lookup table may be stored in computer memory (e.g., memory accessible to the risk calculation module) to provide calendar charge adjustment values for particular swap tenor combinations in the portfolio. For example, assume the basic performance bond calculation (based on swap dollar values and volatility values) results in a performance bond amount of $650. Also assume that the portfolio contains just two interest rate swaps: one with swap tenor of 1 month and another with a swap tenor of 3 years. The calendar charge lookup table may provide that a 1 month to 3 year spread in the exemplary portfolio results in a calendar charge adjustment value of $250. As such, the total performance bond amount required to manage the risk of the portfolio is $900 (i.e., $650 plus $250). One skilled in the art will appreciate that the calendar charge lookup table may be divided into varying granularity. For example, in FIG. 6, the table may be simplified by dividing swap tenors into tiers and assigning a calendar charge adjustment value based on tier combinations (see ref. 602). A first tier may be all swap tenors 1 year or less, a second tier may be swap tenors from 1 year to 2 year, and a third tier may be swap tenors greater than 2 years, but not less than 10 years, and a fourth tier may be all swap tenors greater than 10 years. In an alternate embodiment, the calendar charge lookup table may be done at the finest granularity (e.g., daily) to provide for greater precision in calculating the adjustment value. One skilled in the art will appreciate that the amount of computing power required for accessing and maintaining such a table would be greater.

Figure 7:
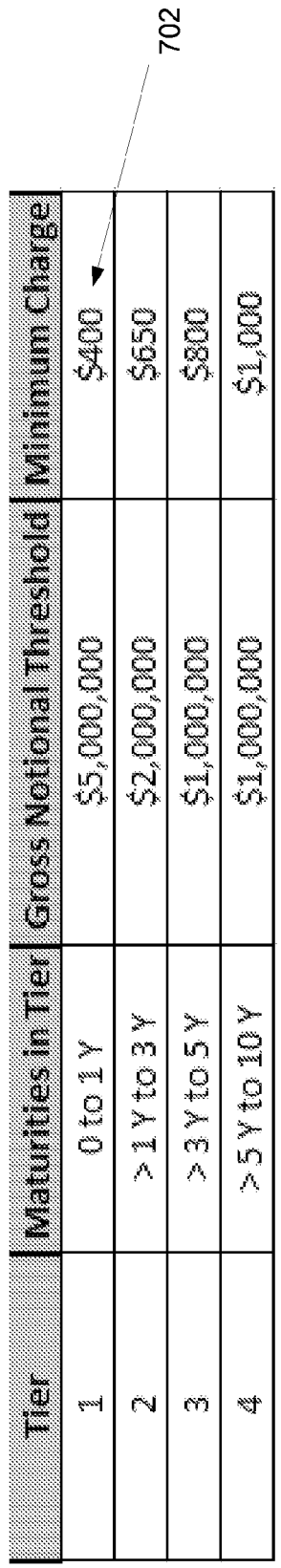
FIG. 7 shows a high-level illustration of a liquidity charge minimum lookup table in accordance with various aspects of the invention.

The risk calculation module (or risk processor), in some embodiments in accordance with aspects of the invention, may adjust the calculated performance bond amount to a liquidity charge minimum to account for liquidity risks inherent to swap tenors. Liquidity charges may be calculated using historical data (e.g., two years of historical data, with 2-days of P&L coverage, and 99% VaR). The liquidity charge minimum may be used to ensure that performance bond requirements are not too low. For example, FIG. 7 illustrates an exemplary liquidity charge minimum lookup table indexed by swap tenor tiers and gross notional values. For example, a portfolio of three 1-year swaps with a gross notional amount of $6 million, would be subjected to a liquidity charge minimum of $400 (see ref. 702). As such, if the calculated performance bond amount is less than $400, then the performance bond amount may be adjusted at the risk calculation module (or risk processor) to be at least $400. Meanwhile, if the calculated performance bond amount is already greater than the $400 floor, then the performance bond amount may be left unchanged.

In accordance with aspects of the invention, a clearinghouse may act as a central counter party on the interest rate swaps. As such, the clearinghouse may centrally clear the interest rate swaps in the portfolio. Moreover, the clearinghouse may be able to calculate performance bond amount requirements on a daily (or other predetermined interval) basis or realtime basis. At least one benefit of an exchange-traded swap (i.e., centrally cleared), as opposed to the over-the-counter (OTC) type, is that the swap may be is cleared, marked-to-market, and facilitated by the clearinghouse. This may promise more interesting capital efficiencies for institutions that may cross-margin one swap against another.

In another embodiment in accordance with aspects of the invention, software modules may be included in computer system 100 to provide a holder of a portfolio with advance notice of the effect of a possible trade on margin requirements. As such, the holder (e.g., trader) may consider the margin account effects of his/her actions before proceeding, thus avoiding a potential margin call. In yet another embodiment, an interactive display may be generated to show the total gross notional value of a portfolio (or group of portfolios) and the performance bond amount posted in association with those portfolio(s). As such, an auditor of a clearinghouse can instantly view and manage the risk at any given time. Other information, e.g., charges due to curve shocks, spread charges, total margin, portfolio DV01, gross notional value, and other information may be displayed on the graphical user interface. One skilled in the art will appreciate that the numerous data and analysis described above may be used to enhance risk management of a clearinghouse.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. For example, although numerous examples recite interest rate swaps, one skilled in the art will appreciate that the novel principles disclosed herein may be applied to other types of financial instruments and still fall within the scope of the invention contemplated herein.

We claim:

1. A method comprising:
 calculating a performance bond amount for a plurality of interest rate swaps in a portfolio of financial assets using a risk calculation module of an exchange computer system,
 where the calculating includes:
  receiving swap dollar values at the exchange computer system risk calculation module, wherein each swap dollar value represents a dollar value of a one basis point change in a fixed interest rate swap;
  receiving volatility values at the exchange computer system risk calculation module; and
  determining the performance bond amount, at the exchange computer system risk calculation module, as a function of the swap dollar value and the volatility value corresponding to each interest rate swap in the portfolio;
  determining if a margin account balance associated with the portfolio is less than the calculated performance bond amount; and
  generating a notification that an increase in the amount of the margin account balance to at least the calculated performance bond amount is required.

2. The method of claim 1, where the determining the performance bond amount as a function of the swap dollar value and the volatility value includes the exchange computer system risk calculation module multiplying the swap dollar value by the volatility value corresponding to each interest rate swap in the portfolio.

3. The method of claim 2, where the calculating further includes: the exchange computer system risk calculation module summing the products of the multiplications corresponding to each interest rate swap in the portfolio.

4. The method of claim 1, where the calculating further includes: the exchange computer system risk calculation module adjusting the performance bond amount by a calendar charge adjustment to account for non-parallel shifts in a swap curve.

5. The method of claim 1, where the calculating further includes:
 the exchange computer system risk calculation module determining whether the performance bond amount is less than a liquidity charge minimum, where the liquidity charge minimum is a function of liquidity risk of swap tenors in the portfolio;
 if the performance bond amount is less than the liquidity charge minimum, the exchange computer system risk calculation module adjusting the performance bond amount to the liquidity charge minimum; and
 if the performance bond amount is not less than the liquidity charge minimum, the exchange computer system risk calculation module leaving unchanged the performance bond amount.

6. The method of claim 1, where the swap dollar value of an interest rate swap is based on time remaining until maturity of the interest rate swap and a fixed rate of the interest rate swap.

7. The method of claim 6, where swap dollar values of interest rate swaps are updated on at least a daily basis.

8. The method of claim 7, where swap dollar values of interest rate swaps are updated in realtime.

9. The method of claim 1, where the volatility value of an interest rate swap is based on time remaining until maturity of the interest rate swap.

10. The method of claim 9, where the volatility value of the interest rate swap is irrespective of the fixed rate of the interest rate swap.

11. The method of claim 9, where the volatility value of the interest rate swap is based on historical volatility values of interest rate swaps with substantially equal time remaining until maturity.

12. The method of claim 9, where the volatility value of the interest rate swap is determined using a volatility lookup table indexed by swap tenors at predetermined intervals.

13. The method of claim 1, where the calculating of the performance bond amount is performed at least daily.

14. The method of claim 13, where the calculating of the performance bond amount is performed in realtime.

15. The method of claim 1, where the plurality of interest rate swaps in the portfolio are configured to be centrally cleared.

16. The method of claim 4, where the calendar charge adjustment is determined using a calendar charge lookup table indexed by swap tenor combinations.

17. The method of claim 16, where the swap tenor combinations are based on a tiered structure.

18. The method of claim 5, where the liquidity charge minimum is determined using a liquidity charge minimum lookup table indexed by swap tenor tiers and gross notional values.

19. The method of claim 1, where the generating a notification includes requesting a holder of the portfolio to increase the amount of the performance bond to at least the calculated performance bond amount.

20. An apparatus comprising:
a computer memory storing computer-executable instructions; and
a processor coupled to the memory and configured to execute the instructions so as to cause the apparatus to calculate a performance bond amount for a plurality of interest rate swaps in a portfolio of financial assets, and wherein the calculating includes
receiving swap dollar values, wherein each swap dollar value represents a dollar value of a one basis point change in a fixed interest rate swap,
receiving volatility values, and
determining the performance bond amount as a function of the swap dollar value and the volatility value corresponding to each interest rate swap in the portfolio.

21. The apparatus of claim 20, where the calculating includes multiplying the swap dollar value by the volatility value corresponding to each interest rate swap in a portfolio.

22. The apparatus of claim 21, where the calculating includes summing the products of the multiplications corresponding to each interest rate swap in a portfolio.

23. The apparatus of claim 20, where the memory further stores information corresponding to a calendar charge lookup table, and where the processor is configured to execute the instructions so as to cause the apparatus to adjust the performance bond amount by a calendar charge adjustment.

24. The apparatus of claim 20, where the memory further stores information corresponding to a liquidity charge minimum lookup table, and where the processor is configured to execute the instructions so as to cause the apparatus to adjust the performance bond amount to at least a liquidity charge minimum.

25. The apparatus of claim 20, where the processor is configured to execute the instructions so as to cause the apparatus to receive information corresponding to an updated volatility lookup table and updated swap dollar value matrix at least daily.

26. The apparatus of claim 20, where the processor is configured to execute the instructions so as to cause the apparatus to receive information corresponding to an updated volatility lookup table and updated swap dollar value matrix in realtime.

27. A computer-readable storage medium containing computer-executable instructions for performing a method comprising:
receiving swap dollar values, wherein each swap dollar value represents a dollar value of a one basis point change in a fixed interest rate swap;
receiving volatility values;
calculating a performance bond amount for a plurality of interest rate swaps in a portfolio of financial assets as a function of the swap dollar value and the volatility value corresponding to each interest rate swap in a portfolio; and
determining whether a margin account balance associated with the portfolio is less than the calculated performance bond amount.

28. The computer-readable storage medium of claim 27, wherein the calculating comprises multiplying the swap dollar value by the volatility value corresponding to each interest rate swap in a portfolio.

29. The computer-readable storage medium of claim 28, wherein calculating comprises summing the products of the multiplications corresponding to each interest rate swap in a portfolio.

30. The computer-readable storage medium of claim 27 containing computer-executable instructions for performing a method comprising:
adjusting the performance bond amount by a calendar charge adjustment, where the calendar charge adjustment is determined using a calendar charge lookup table indexed by swap tenor combinations.

31. The computer-readable storage medium of claim 27 containing computer-executable instructions for performing a method comprising:
determining whether the performance bond amount is less than a liquidity charge minimum, where the liquidity charge minimum is determined using a liquidity charge minimum lookup table indexed by swap tenor tiers and gross notional values;
if the performance bond amount is less than the liquidity charge minimum, adjusting at the risk calculation module the performance bond amount to the liquidity charge minimum; and
if the performance bond amount is not less than the liquidity charge minimum, leaving unchanged the performance bond amount.

* * * * *